(12) United States Patent
Espinoza et al.

(10) Patent No.: US 6,228,163 B1
(45) Date of Patent: May 8, 2001

(54) CLAY-FREE READY-MIXED SETTING-TYPE JOINT COMPOUND

(75) Inventors: Therese A. Espinoza, Wood Dale; Charles J. Miller, McHenry; Richard B. Stevens, Crystal Lake, all of IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 09/474,485

(22) Filed: Dec. 29, 1999

(51) Int. Cl.$^7$ ...................................... C04B 28/14
(52) U.S. Cl. .................... 106/778; 106/772; 106/779; 106/780
(58) Field of Search ...................... 106/778, 772, 106/779, 780

(56) References Cited

U.S. PATENT DOCUMENTS

| | | | |
|---|---|---|---|
| 4,238,239 | * 12/1980 | Brown | 106/116 |
| 4,661,161 | * 4/1987 | Jakacki et al. | 106/112 |
| 5,336,318 | * 8/1994 | Attard et al. | 106/780 |
| 5,725,656 | * 3/1998 | Shimanovich et al. | 106/778 |
| 5,746,822 | * 5/1998 | Espinoza et al. | 106/785 |

* cited by examiner

*Primary Examiner*—Elizabeth D. Wood
(74) *Attorney, Agent, or Firm*—Jenkens & Gilchrist

(57) ABSTRACT

A two part joint compound which sets by hydration of calcium sulfate hemihydrate to gypsum and is clay-free. One part includes an in-situ acidic acrylate copolymer thickener (i.e., an associative thickener) with the calcium sulfate hemihydrate, along with a non-calcium bearing phosphate set preventer. The first part contains water, but remains unset for at least 175 days. The second part includes a set initiator compound having a cation with a log K value greater than calcium ions. The second part is mixed with the first part when setting is desired.

27 Claims, No Drawings

CLAY-FREE READY-MIXED SETTING-TYPE JOINT COMPOUND

BACKGROUND OF THE INVENTION

The invention relates generally to cementitious compositions which are particularly useful as joint compounds, such as are used in finishing gypsum drywall panels. More specifically, the compositions are of the premixed settable-type, that is, they contain a cementitious settable base that has been premixed with water and prevented from setting, but will set and harden by chemical reaction with the water when a set initiator is added, although they may be used as drying-type joint compounds, if desired. The compositions also have other applications, including, but not limited to, firestop compounds, ornamental and casting plasters, spackling compounds, and base coat and finishing plasters.

Joint compounds are applied to complete the installation of gypsum panels by filling the space between adjacent panels, typically in combination with paper or fiberglass tape. The joint compound is forced into the space between the panels, either before or after the tape is applied. After the space between the panels has been filled, an additional coat or coats of joint compound, either the same as the first or formulated for the purpose, are generally applied to provide a smooth transition between the panels, after which the panels will usually be painted or receive some other surface finish.

Generally, joint compounds contain a filler, a binder, and a thickener. Conventional fillers include calcium carbonate, calcium sulfate dihydrate (gypsum), and calcium sulfate hemibydrate (plaster of Paris). Calcium sulfate hemihydrate sets by hydration to gypsum, while compounds using other fillers harden by simple drying. Thus, joint compounds are usually divided into two types, setting or drying, depending on whether the filler contains a substantial amount of calcium sulfate hemihydrate.

When a powdered setting-type joint compound is mixed with water, the calcium sulfate hemihydrate will react with the water to form gypsum. This occurs quite rapidly, usually between 5 and 300 minutes. Consequently, water cannot be added to powdered setting-type joint compounds until just prior to application to joints in the wallboard. To overcome problems of adding water at the time of use, joint compounds have been formulated to prevent the reaction of the hemihydrate with water so that premixed setting-type joint compounds can be manufactured. Setting compounds also have an advantage relative to drying-type joint compounds, since drying-type compounds will shrink during drying, requiring multiple coats and sufficient drying time between coats, making it difficult to achieve a smooth surface suitable for decorating in a timely manner.

Premixed setting-type joint compounds have been suggested in previous patents. For example, U.S. Pat. No. 4,661,161 discloses a set retarding composition in which a proteinaceous ingredient formed from animal tissues and a chelating agent for calcium ions is used. An accelerator including a compound having a higher log K value than calcium is mixed with the joint compound when setting is desired.

As noted in U.S. Pat. No. 5,746,822 ("'822 patent"), the shelf life of such ready-mixed setting joint compound is not sufficient since the activity of the set retarder was found to be degraded with time. Thus, the '822 patent discloses an improved setting-type joint compound which includes non-calcium bearing phosphate additives to prevent setting of a premixed joint compound which includes water. The shelf life is said to be at least several months. Again, compounds having cations having a higher log K value than calcium are employed as accelerators just before the joint compound is used to initiate the setting action. Each of the Examples and the allowed claims indicate that attapulgus clay should be included in the premixed joint compound.

U.S. Pat. No. 5,725,656 ("'656 patent") discloses an artificial marble plaster composition containing calcined gypsum which does not require the use of clays, but adds an acrylic latex and an aliphatic alcohol as set retarding agents. The objective appears to be to extend the setting time, rather than provide a premixed joint compound in which the calcium sulfate hemihydrate is prevented from setting, despite the presence of water. The maximum setting time reported for the preferred composition is 90 minutes. The '656 patent also indicates that addition of a melamine formaldehyde polymer assists in the retarding action.

U.S. Pat. No. 5,653,797 ("'797 patent") also discloses a formulation for a setting-type joint compound, which includes polymers having acrylic acid and acrylamide monomer units as set retarding agents. The polymers are said to be capable of providing a shelf life of about 2 years. Clays are recommended as "non-leveling agents" to improve the Theological properties of the joint compound and are included in each of the Examples.

U.S. Pat. No. 5,336,318 ("v'318 patent") discloses a drying-type joint compound which is clay-free. The problems associated with premature setting of calcium sulfate hemihydrate are not of concern in this formulation, however, since no hemihydrate is used. The disadvantages associated with clay are said to be avoided by replacing clay with in-situ associative thickeners, such as acidic acrylate copolymers. Advantages are stated to be improved viscosity stability, crack resistance, and shrinkage. The thickeners are used with a pH of 8 to 10, and addition of alkaline materials is suggested to provide the desired pH.

As discussed above, the premixed setting-type joint compound of the '822 patent includes clays as non-leveling agents and a substitute for the asbestos previously used. The present inventors have found that clays have a more important is role than originally recognized. Without clays, a premixed setting-type joint compound has a tendency to settle and harden. When settling occurs, some of the set prevention effect appears to be lost, and attempts to remix the joint compound have been unsuccessfiul. By contrast, settling of a drying-type joint compound can be reversed by mixing without affecting its performance.

The present inventors have found a further improved setting-type joint compound which, although it is clay-free, has superior properties and shelf life as discussed below.

SUMMARY OF THE INVENTION

In one aspect, the invention is a ready-mixed (premixed) setting-type cementitious composition useful as a joint compound, which sets by hydration of calcium sulfate hemihydrate to form gypsum. Associative thickeners are used in the composition instead of clay and, while they do not contribute to preventing set of the calcium sulfate hemihydrate, the associative thickeners do permit achieving a shelf life of at least 175 days since they prevent settling and maintain workability of the compound. The composition also includes a non-calcium bearing phosphate (e.g., tetra sodium pyrophosphate) as a set preventer. The composition has a shelf life of at least 175 days, but is expected to be storable for several years. It may be set by mixing with an initiator comprising a compound having a log K value higher than calcium ions or, alternatively, used as a drying-type joint compound in the absence of an initiator. Other additives may include cellulose thickeners, resin microspheres, talc, mica, perlite, fibers, citric acid, fungicides, and bactericides.

In another aspect, the invention is a two part joint compound system, one part of which is a premixed setting-type cementitious composition which sets by hydration of calcium sulfate hemihydrate to form gypsum. The composition is clay free and is prevented from setting for at least 175 days by including non-calcium bearing phosphate set preventers. Associative thickeners are included to prevent settling and to maintain workability.

The premixed first part of the joint compound of the invention includes, based on the total solids content of the joint compound, about 20 to about 99 wt. % of calcium sulfate hemihydrate, preferably the alpha crystalline form, about 0.1 to 10 wt. % of a non-calcium bearing phosphate as a set preventer, and about 0.025 to 0.5 wt. % of an associative thickener, preferably an in-situ acidic acrylate copolymer thickener. Other fillers and additives, as described above, may be included.

The second part of the two part joint compound includes about 0.01 to about 0.03 wt. %, based on the first part, of at least one compound having a log K value higher than calcium ions, which serves as an initiator for setting of the first part. Zinc sulfate is a preferred accelerator.

In one preferred embodiment, the ready-mixed joint compound contains, based on the total solids content of the joint compound, from about 60 to about 80 wt. % of calcium sulfate hemihydrate, about 10 to about 20 wt. % of calcium carbonate, about 2 to about 5.5 wt. % of a latex binder, about 0.25 to about 0.5 wt. % of a non-calcium bearing phosphate set preventer, about 0.05 to about 0.15 wt. % of the associative thickener, about 5 to about 10 wt. % of perlite, and enough water to provide the desired consistency.

DESCRIPTION OF ILLUSTRATIVE EMBODIMENTS

A settable joint compound is one which sets by chemical reaction, rather than by drying. In the present invention, a settable joint compound is one which is settable by hydration of calcium sulfate hemihydrate ($CaSO_4 \cdot \frac{1}{2}H_2O$) to gypsum ($CaSO_4 \cdot 2H_2O$). A ready-mixed joint compound of this type will contain water, but will not set since it is prevented from doing so by the presence of a set preventer, in particular, the non-calcium bearing phosphates of the '822 patent. The clays used in the '822 patent formulations are replaced by associative thickeners, which have no significant role in the hydration reaction, but provide suitable consistency and prevent settling of the solids. The ready-mixed joint compounds will set after they are mixed with a set initiator, which overcomes the effect of the phosphate set preventers.

Associative Thickeners

In the '318 patent, associative thickeners are used to replace asbestos and attapulgus clays in formulations of joint compounds of the drying-type. For that use, such thickeners could have no effect on hydration of calcium sulfate hemihydrate, since none is present. Associative thickeners are defined in the '318 patent as acidic polymer emulsions which react with alkaline materials to form a clear viscous solution. It was noted that typical compositions are disclosed in U.S. Pat. Nos. 4,600,761 and 4,616,074, both assigned to Alco Chemical Corp. Examples of wall joint compounds are provided in these Alco Chemical patents, but they contain clay and a substantial amount of titanium dioxide and apparently were not of the setting-type.

Alkaline materials in the joint compound of the invention include calcium sulfate hemihydrate and calcium carbonate. Contrary to their suggested use in the '318 patent, alkalis, such as sodium hydroxide, hydrated lime, ammonium hydroxide, or magnesium oxide, are not required to raise the pH to activate the associative thickeners in joint compounds of the invention.

There are many associative thickeners commercially available, for example, those marketed as Alcogum (Alco Chemical Company), Viscalex (Allied Colloids Inc.), and Acrysol (Rohm & Haas). Associative thickeners which have been found to be particularly useful in ready-mixed joint compounds of the invention may be classified as in-situ acidic acrylate copolymer associative thickeners, and may be referred to herein simply as "associative thickeners." In particular, acidic acrylate copolymers have been found to be useful, such as those designated as Alcogum by Alco Chemical. It is believed that the reaction of such materials with the alkaline compounds in the joint compound thicken the slurry and suspend the other particles. In contrast to the polymers of the '797 patent, the associative thickeners do not appear to have a significant effect on the set preventing role of the phosphates, as will be seen in the Example 7 below. The associative thickener will generally be in the range of about 0.025 to about 0.5 wt. %, expressed as the polymer, of the solids content of the joint compound, as determined by its effect on workability of the joint compound. Preferably, about 0.05 to about 0.15 wt. % will be used. The associative thickeners may be powders (i.e., 100% solids) or emulsions (e.g., 26% for Alco L-11). In the Examples below, the associative thickener is in an emulsion form and the solids content is noted.

Non-Calcium Bearing Phosphate Set Retarders

As discussed in the '822 patent, certain non-calcium bearing phosphates have been found to have a long term set preventing effect. The present inventors believe that set prevention better describes the performance of these phosphates, rather than merely "set retarders." Examples of such phosphates include zinc hexametaphosphate, potassium tripolyphosphate, tetra sodium pyrophosphate, sodium tripolyphosphate, monoammonium phosphate, and monobasic potassium phosphate. Tetra sodium pyrophosphate is a preferred set preventer. The amount required may vary from about 0.1 to about 10 wt. %, based on the total solids content of the joint compound, preferably from about 0.2 to about 0.5 wt. %.

Other Additives

The non-calcium bearing phosphate compounds are needed to prevent the calcium sulfate hemihydrate from prematurely setting when in the presence of water. The associative thickeners provide needed stiffness to the joint compound previously supplied by clays. The term "stiffness" implies a degree of thixotropic performance useful in joint compounds. That is, the joint compound is relatively immobile until applied and worked with tools. In addition, the associative thickener also adds to the water demand needed for good workability, and a suspending property that maintains a homogeneous mixture and keeps components from settling and prematurely forming an unusable and unworkable mass. Other additives may be included in order to provide other desired properties.

Conventional cellulosic thickeners may be added to adjust the viscosity of the joint compound. They generally do not provide the stiffening property available from associative thickeners. Examples include ethylhydroxy ethylcellulose, hydroxypropyl methylcellulose, methylhydroxypropyl cellulose, hydroxyethyl cellulose, and the like. The amount used may vary up to about 1 wt. % of the solids content of the joint compound, as required to meet the desired consistency. Preferably, about 0.35 to about 0.6 wt. %, based on the solids content of the joint compound, will be used.

Latex emulsion binders are often used in joint compounds and may be included in joint compounds of the invention. Examples include polyvinyl acetate and ethylene vinyl acetate emulsions. The amount used may range from about 1.5 to about 7 wt. % of the solids content of the joint compound, preferably about 2 to about 5.5 wt. %.

Reduced weight may be provided by addition of lightweight spheres, such as an expanded perlite or resin microspheres. Fibers may also be added, if desired.

Other additives which may have use in joint compounds of the invention include mica, talc, citric acid, fingicides, and bactericides. Wetting agents, defoamers, and plasticizers may also be included.

Calcium Sulfate Hemihydrate

Setting of the joint compound is primarily the result of hydration of calcium sulfate hemihydrate to the dihydrate form, gypsum. There are two principal forms used, the alpha and beta crystalline forms. In general, the alpha form is the more expensive of the two and produces a stronger product. The beta form is adequate for many uses and, being less expensive, is more commonly used. For joint compounds of the invention, either type of the hemihydrate may be used, but the alpha form is preferred.

Since other fillers and additives may be included, the amount of the calcium sulfate hemihydrate used may vary widely, from about 20 to about 99 wt. % of the solids content of the joint compound before a set initiator is added. Preferably, the amount of the hemihydrate will be about 60 to 80 wt. %. Once the desired amount of hemihydrate has been selected, the amount of set preventer necessary to prevent setting of the hemihydrate can be determined, generally the set preventer will be about 0.1 to 10 wt. %, based on the total joint compound.

Calcium carbonate may be included as a non-reactive filler, preferably about 10 to about 20 wt. % based on the total solids content of the joint compound.

Formulation of a Joint Compound

Of the ingredients in a typical joint compound of the invention, most are dry solids. They include the calcium sulfate hemihydrate, calcium carbonate, cellulose thickener, perlite (optional), mica, talc, phosphate set preventers, and citric acid. The liquid components include the associative thickener (if in emulsion form), preservatives, latex emulsion binder, and sufficient water to achieve the desired consistency. Typically, most of the liquid components are added to a blender, after which the dry ingredients are added. The phosphate set preventer is generally premixed with citric acid and a little water before being added to the liquid, but before the dry ingredients are added. The ingredients are mixed until smooth and then packaged for use.

The premixed first part of the joint compound is blended with the set initiator when it is desired to use the material as a setting joint compound for application to wallboard seams.

Since the amount of the set initiator is generally small compared to the first part of the joint compound, uniform blending is important. A pigment, such as red iron oxide, may be added to the set initiator to provide an indication that the mixing is complete.

Set Initiators

Set initiators, also called accelerators in the '822 patent, contain at least one compound which has a log K value greater than calcium. Log K is the logarithm of the equilibrium constant K of the chelating reaction of diethylene triamine pentaacetic acid with a given metal cation. Table I in the '822 patent provides a list of metal ions and their log K values. Zinc sulfate is considered to be a superior set initiator, although the numerical difference between zinc and calcium in Table I is not the largest shown. As suggested in the '822 patent, aluminum sulfate and ferrous ion-containing compounds could be used, but they are not recommended since they have detrimental effects. The amount of the set initiator will depend on the amount required to overcome the set preventing effect of the non-calcium bearing phosphates. Generally, about 0.01 to 0.03 wt. % of the set initiator, based on the weight of the premixed first part of the joint compound, will be used.

Although the reasons for the effectiveness of the set preventers described above are not fully known, it is believed that they function by sequestering calcium ions and/or calcium compounds, inhibiting crystal growth. It is believed that the set initiators function by preferentially binding to the set preventer, freeing the calcium ions and/or calcium compounds to initiate the setting reaction and crystal growth.

EXAMPLES

Example 1

A clay-free settable premixed joint compound was made by combining the following ingredients.

| Ingredients | Amount (grams) |
| --- | --- |
| Calcium sulfate hemihydrate (alpha) | 533.63 |
| Calcium carbonate filler | 112.5 |
| Treated expanded perlite[1] | 52.5 |
| Cellulosic thickener[2] | 2.63 |
| TSPP set preventer[3] | 3 |
| Citric acid | 0.75 |
| Associative thickener[4] | 2.25 |
| Ethylene vinyl acetate binder[5] | 75 |
| Fungicide[6] | 0.75 |
| Bactericide[7] | 0.75 |
| Water | 375 |

[1]Sil-cell 35-34 (Silbrico Corporation)
[2]Methocel 250S (The Dow Chemical Company)
[3]TSPP = tetra sodium pyrophosphate
[4]Alco L-11 (Alco Chemical Company) - emulsion containing 26% solids
[5]Elvace CPS 716 (Reichhold Chemical) 55% solids
[6]Fungitrol 158 (Huls America)
[7]Nuosept 91 (Huls America)

The TSPP set preventer and citric acid were added to a small amount of water and predispersed prior to adding to the mixer. The dry ingredients were added to a mixer containing water, ethylene vinyl acetate binder, fungicide, and bactericide. The amount of water was adjusted until the mixture reached a viscosity between 200 and 500 Brabender units (with a pin-type probe). The mixture was blended until it was smooth and then packaged in a plastic container for storage at room temperature. The condition of the mixture was examined periodically for workability, that is, approximately once every three months. After 564 days, it was found to be easily mixed and useful as a joint compound.

This result demonstrates that a ready-mixed setting-type joint compound which is clay-free, but contains an acidic acrylate copolymer in-situ thickener, remains in workable condition after about 18 months.

Example 2 (Comparative)

A second joint compound was prepared as described in Example 1, except that the associative thickener (Alco L-11) was omitted. The set preventer (TSPP) was included to prevent hydration of the calcium sulfate hemihydrate to gypsum. The joint compound combined the following ingredients.

| Ingredients | Amount (grams) |
| --- | --- |
| Calcium sulfate hemihydrate (alpha) | 535.88 |
| Calcium carbonate filler | 112.5 |
| Treated expanded perlite[1] | 52.5 |
| Cellulosic thickener[2] | 2.63 |
| TSPP set preventer[3] | 3 |
| Citric acid | 0.75 |
| Associative thickener[4] | 0 |
| Ethylene vinyl acetate binder[5] | 75 |
| Fungicide[6] | 0.75 |
| Bactericide[7] | 0.75 |
| Water | 305 |

[1] Sil-cell 35-34 (Silbrico Corporation)
[2] Methocel 250S (The Dow Chemical Company)
[3] TSPP = tetra sodium pyrophosphate
[4] Alco L-11 (Alco Chemical Company) - emulsion containing 26% solids
[5] Elvace CPS 716 (Reichhold Chemical) 55% solids
[6] Fungitrol 158 (Huls America)
[7] Nuosept 91 (Huls America)

After 564 days, the joint compound was found to be very heavy and stiff, and very difficult to remix into a workable joint compound. Due to the absence of the associative thickener, severe settling of the particles had occurred, thus confirming the need for the associative thickener as a suspending aid.

Example 3

A third joint compound was prepared as described in Example 1, except that the amount of the associative thickener was reduced by two-thirds to 0.025 wt. %, based on the dry ingredients. The joint compound combined the following ingredients.

| Ingredients | Amount (grams) |
| --- | --- |
| Calcium sulfate hemihydrate (alpha) | 535.13 |
| Calcium carbonate filler | 112.5 |
| Treated expanded perlite[1] | 52.5 |
| Cellulosic thickener[2] | 2.63 |
| TSPP set preventer[3] | 3 |
| Citric acid | 0.75 |
| Associative thickener[4] | 0.75 |
| Ethylene vinyl acetate binder[5] | 75 |
| Fungicide[6] | 0.75 |
| Bactericide[7] | 0.75 |
| Water | 350 |

[1] Sil-cell 35-34 (Silbrico Corporation)
[2] Methocel 250S (The Dow Chemical Company)
[3] TSPP = tetra sodium pyrophosphate
[4] Alco L-11 (Alco Chemical Company) - emulsion containing 26% solids
[5] Elvace CPS 716 (Reichhold Chemical) 55% solids
[6] Fungitrol 158 (Huls America)
[7] Nuosept 91 (Huls America)

After 564 days, the joint compound retained its workability, although it was judged less workable compared to the joint compound of Example 1.

Example 4

A fourth joint compound was prepared as described in Example 1, except that the amount of the associative thickener was increased from 0.075 to 0.5 wt. %. The joint compound combined the following ingredients.

| Ingredients | Amount (grams) |
| --- | --- |
| Calcium sulfate hemihydrate (alpha) | 520.88 |
| Calcium carbonate filler | 112.5 |
| Treated expanded perlite[1] | 52.5 |
| Cellulosic thickener[2] | 2.63 |
| TSPP set preventer[3] | 3 |
| Citric acid | 0.75 |
| Associative thickener[4] | 15 |
| Ethylene vinyl acetate binder[5] | 75 |
| Fungicide[6] | 0.75 |
| Bactericide[7] | 0.75 |
| Water | 300 |

[1] Sil-cell 35-34 (Silbrico Corporation)
[2] Methocel 250S (The Dow Chemical Company)
[3] TSPP = tetra sodium pyrophosphate
[4] Alco L-11 (Alco Chemical Company) - emulsion containing 26% solids
[5] Elvace CPS 716 (Reichhold Chemical) 55% solids
[6] Fungitrol 158 (Huls America)
[7] Nuosept 91 (Huls America)

Afer 564 days, the joint compound retained its workability, despite having a much larger thickener content.

Example 5

A fifth joint compound was prepared as described in Example 1, except that an alternative associative thickener was used. The joint compound combined the following ingredients.

| Ingredients | Amount (grams) |
| --- | --- |
| Calcium sulfate hemihydrate (alpha) | 528.38 |
| Calcium carbonate filler | 112.5 |
| Treated expanded perlite[1] | 52.5 |
| Cellulosic thickener[2] | 2.63 |
| TSPP set preventer[3] | 3 |
| Citric acid | 0.75 |
| Associative thickener[4] | 7.5 |
| Ethylene vinyl acetate binder[5] | 75 |
| Fungicide[6] | 0.75 |

-continued

| Ingredients | Amount (grams) |
|---|---|
| Bactericide[7] | 0.75 |
| Water | 250 |

[1]Sil-cell 35-34 (Silbrico Corporation)
[2]Methocel 250S (The Dow Chemical Company)
[3]TSPP = tetra sodium pyrophosphate
[4]Alco L-62 (Alco Chemical Company) - emulsion containing 30% solids
[5]Elvace CPS 716 (Reichhold Chemical) 55% solids
[6]Fungitrol 158 (Huls America)
[7]Nuosept 91 (Huls America)

After 481 days, the joint compound was found to be workable, although somewhat heavier than compounds containing the thickener used in the previous Examples.

Example 6 (Comparative)

In this Example, the associative thickeners of the invention were replaced by a polyacrylate dispersant (Colloid 231 from Rhone-Poulenc, now designated Rhodoline 231 from Rhodia), described in the '797 patent, as a set retarder. The joint compound combined the following ingredients.

| Ingredients | Amount (grams) |
|---|---|
| Calcium sulfate hemihydrate (alpha) | 532.13 |
| Calcium carbonate filler | 112.5 |
| Treated expanded perlite[1] | 52.5 |
| Cellulosic thickener[2] | 2.63 |
| TSPP set preventer[3] | 0 |
| Citric acid | 0 |
| Dispersant[4] | 7.5 |
| Ethylene vinyl acetate binder[5] | 75 |
| Fungicide[6] | 0.75 |
| Bactericide[7] | 0.75 |
| Water | 265 |

[1]Sil-cell 35-34 (Silbrico Corporation)
[2]Methocel 250S (The Dow Chemical Company)
[3]TSPP = tetra sodium pyrophosphate
[4]Colloid 231 (Rhodoline 231, Rhodia)
[5]Elvace CPS 716 (Reichhold Chemical) 55% solids
[6]Fungitrol 158 (Huls America)
[7]Nuosept 91 (Huls America)

After 481 days, the compound was very stiff, heavy, gritty, lumpy and showed sedimentation with liquid separation. It was concluded that the dispersant Colloid 231 did not provide the workable joint compounds of the invention made with associative thickeners.

Example 7 (Comparative)

A joint compound was prepared, using an associative thickener of the invention, but without the TSPP set preventer. The joint compound combined the following ingredients.

| Ingredients | Amount (grams) |
|---|---|
| Calcium sulfate hemihydrate (alpha) | 523.13 |
| Calcium carbonate filler | 112.5 |
| Treated expanded perlite[1] | 52.5 |
| Cellulosic thickener[2] | 2.63 |
| TSPP set preventer[3] | 0 |
| Citric acid | 0 |
| Associative thickener[4] | 7.5 |
| Ethylene vinyl acetate binder[5] | 75 |
| Fungicide[6] | 0.75 |
| Bactericide[7] | 0.75 |
| Water | 265 |

[1]Sil-cell 35-34 (Silbrico Corporation)
[2]Methocel 250S (The Dow Chemical Company)
[3]TSPP = tetra sodium pyrophosphate
[4]Alco L-62 (Alco Chemical Company) - emulsion containing 30% solids
[5]Elvace CPS 716 (Reichhold Chemical) 55% solids
[6]Fungitrol 158 (Huls America)
[7]Nuosept 91 (Huls America)

After only one day, the joint compound had already set, and it was concluded that the associative thickeners of the invention have substantially no effect as set preventers.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A clay-free ready-mixed joint compound comprising:
   (a) about 20 to about 99 wt. % (based on total solids) of calcium sulfate hemihydrate;
   (b) about 0.025 to about 0.5 wt. % (based on total solids) of an associative thickener;
   (c) about 0.1 to about 10 wt. % (based on total solids) of a non-calcium bearing phosphate set preventer sufficient to prevent setting of the calcium sulfate hemihydrate of (a) until setting is initiated by addition of a set initiator; and
   (d) sufficient water to achieve the desired consistency.

2. A joint compound of claim 1, wherein said associative thickener is an in-situ acidic acrylate copolymer thickener.

3. A joint compound of claim 1, wherein said non-calcium bearing phosphate set preventer is selected from the group consisting of zinc hexametaphosphate, potassium tripolyphosphate, tetra sodium pyrophosphate, sodium tripolyphosphate, monoammonium phosphate, and monobasic potassium phosphate.

4. A joint compound of claim 1, wherein said non-calcium bearing phosphate set preventer is tetra sodium pyrophosphate.

5. A joint compound of claim 1 wherein said calcium sulfate hemihydrate is the alpha crystalline form.

6. A joint compound of claim 1, wherein said calcium sulfate hemihydrate is the beta crystalline form.

7. A joint compound of claim 1, further co mprising calcium carbonate .

8. A joint compound of claim 1, further comprising a latex binder.

9. A joint compound of claim 1, wherein said set initiator comprises a compound having a cation with a log K value greater than that of calcium ions.

10. A joint compound of claim 9, wherein said set initiator compound is zinc sulfate.

11. A joint compound of claim 9, wherein said set initiator compound is added in an amount of about 0.01 to 0.03 wt. %, based on the amount of (a), (b), and (c).

12. A joint compound of claim 1, further comprising additives selected from the group consisting of cellulose thickeners, resin microspheres, talc, mica, perlite, fibers, citric acid, fungicides, and bactericides.

13. A joint compound of claim 1, wherein the amount of components (a), (b) and (c) are 60 to 80 wt. %, 0.05 to 0.15 wt. %, and 0.25 to 0.5 wt. %, respectively.

14. A joint compound of claim 13, further comprising about 10 to 20 wt. % calcium carbonate, about 2 to 5.5 wt. % of a latex binder, and about 5 to 10 wt. % perlite, based on total solids.

15. A two part joint compound system comprising:
   (a) a first part comprising:
      (1) about 20 to about 99 wt. % (based on total solids) of calcium sulfate hemihydrate;
      (2) about 0.025 to about 0.5 wt. % (based on total solids) of an associative thickener;
      (3) about 0.1 to about 10 wt. % (based on total solids) of a non-calcium bearing phosphate set preventer sufficient to prevent setting of the calcium sulfate hemihydrate of (1) until setting is initiated by addition of a set initiator;
      (4) sufficient water to achieve the desired consistency; and
   (b) a second part comprising a set initiator compound having a cation with a log K value greater than that of calcium ions in an amount sufficient to set the hemihydrate of (a)(1).

16. A joint compound of claim 15, wherein said associative thickener of (a)(2) is an in-situ acidic acrylate copolymer thickener.

17. A joint compound of claim 15, wherein said non-calcium bearing phosphate set preventer of (a)(3) is selected from the group consisting of zinc hexametaphosphate, potassium tripolyphosphate, tetra sodium pyrophosphate, sodium tripolyphosphate, monoammonium phosphate, and monobase potassium phosphate.

18. A joint compound of claim 17, wherein said non-calcium bearing phosphate set preventer is tetra sodium pyrophosphate.

19. A joint compound of claim 15, wherein said set initiator of (b) is zinc sulfate.

20. A joint compound of claim 15, wherein said set initiator of (b) is added in an amount of about 0.01 to 0.03 wt.%0obased on the amount of (a)(1)–(3).

21. A joint compound of claim 15, wherein said calcium sulfate hemihydrate of (a)(1) is the alpha crystalline form.

22. A joint compound of claim 15, wherein said calcium sulfate hemihydrate of (a)(1) is the beta crystalline form.

23. A joint compound of claim 15, further comprising calcium carbonate.

24. A joint compound of claim 15, further comprising a latex binder.

25. A joint compound of claim 15, further comprising additives selected from the group consisting of cellulose thickeners, resin microspheres, talc, mica, perlite, fibers, citric acid, fungicides, and bactericides.

26. A joint compound of claim 15, wherein the amounts of components (a)(1), (a)(2) and (a)(3) are 60 to 80 wt. %, 0.05 to 0.15 wt.%, and 0.25 to 0.5 wt. %, respectively.

27. A joint compound of claim 26, further comprising about 10 to 20 wt. % calcium carbonate, about 2 to 5.5 wt. % of a latex binder, and about 5 to 10 wt. % perlite, based on total solids.

* * * * *

UNITED STATES PATENT AND TRADEMARK OFFICE
CERTIFICATE OF CORRECTION

PATENT NO. : 6,228,163 B1
DATED : May 8, 2001
INVENTOR(S) : Therese A. Espinoza et al.

It is certified that error appears in the above-identified patent and that said Letters Patent is hereby corrected as shown below:

Column 10, claim 7,
Line 54, delete "co mprising" insert -- comprising --

Column 12, claim 20,
Line 11, delete "0o"

Signed and Sealed this

Twenty-sixth Day of February, 2002

Attest:

Attesting Officer

JAMES E. ROGAN
Director of the United States Patent and Trademark Office